March 25, 1958 L. F. HAMBLIN 2,828,142
LOAD TRANSFERRING VEHICLE COUPLING OR HITCH
Filed Nov. 1, 1955 3 Sheets-Sheet 1
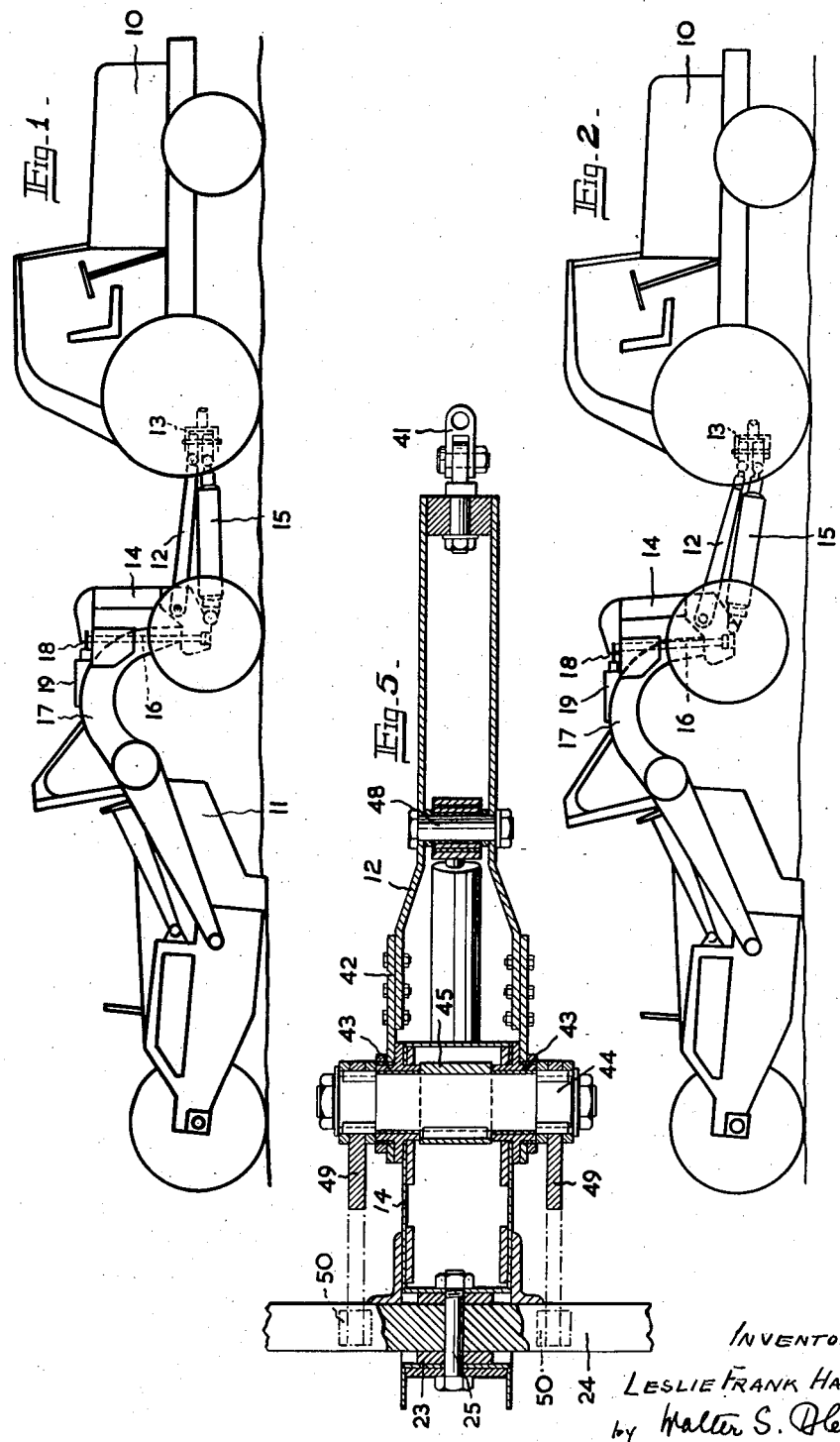
INVENTOR
LESLIE FRANK HAMBLIN
by Walter S. Heston
ATTORNEY

March 25, 1958　　L. F. HAMBLIN　　2,828,142
LOAD TRANSFERRING VEHICLE COUPLING OR HITCH
Filed Nov. 1, 1955　　　　3 Sheets-Sheet 2
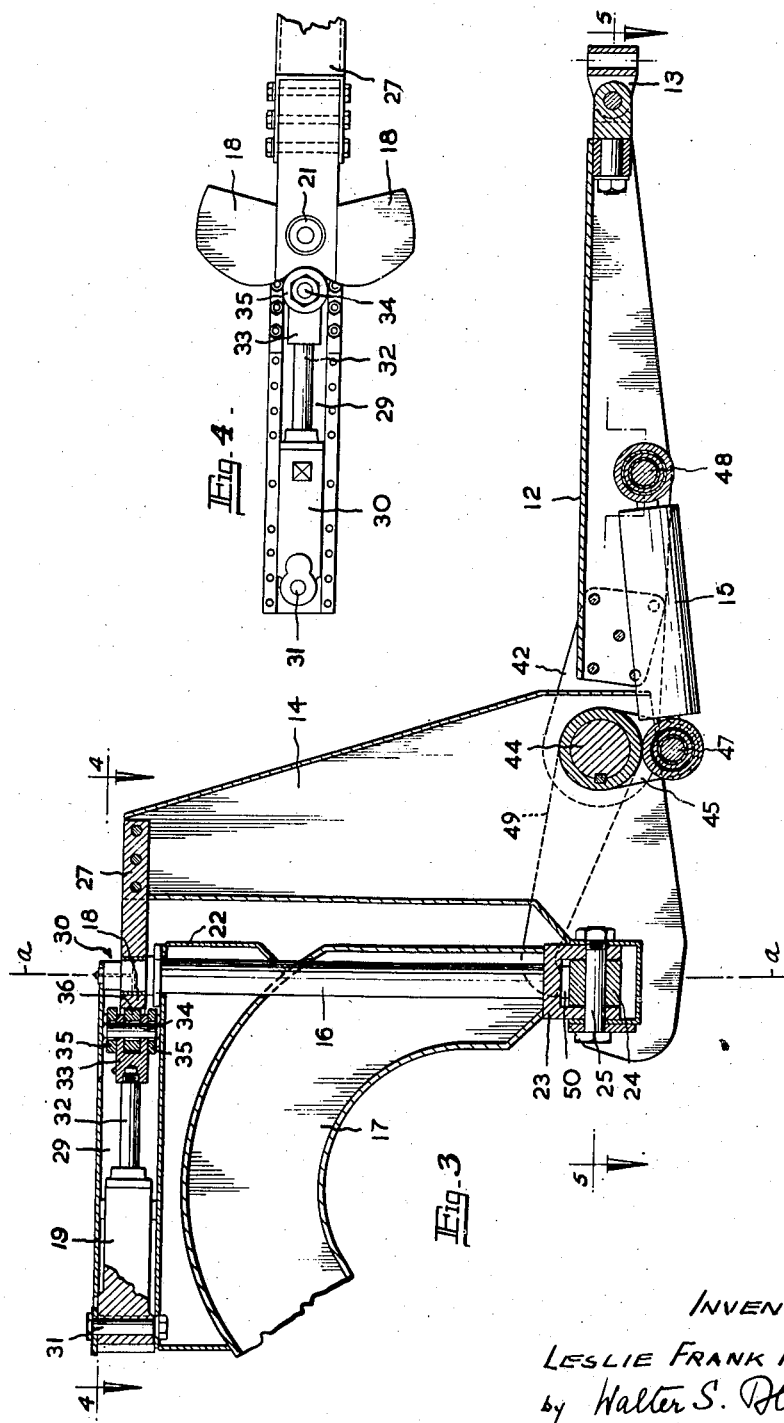
INVENTOR
LESLIE FRANK HAMBLIN
by Walter S. Pleston
ATTORNEY March 25, 1958 L. F. HAMBLIN 2,828,142
LOAD TRANSFERRING VEHICLE COUPLING OR HITCH
Filed Nov. 1, 1955 3 Sheets-Sheet 3

INVENTOR
LESLIE FRANK HAMBLIN
by Walter S. Bleston
ATTORNEY

United States Patent Office 2,828,142
Patented Mar. 25, 1958

2,828,142
LOAD TRANSFERRING VEHICLE COUPLING OR HITCH

Leslie Frank Hamblin, Marchamley, near Shrewsbury, England, assignor to Sentinel (Shrewsbury) Limited, Shrewsbury, England, a British company Application November 1, 1955, Serial No. 544,325
Claims priority, application Great Britain November 6, 1954

12 Claims. (Cl. 280—406)

This invention relates to improvements in vehicle couplings or hitches for coupling a towing vehicle such as a tractor to a trailer or other towed vehicle or implement, and refers particularly to couplings or hitches of the type incorporating means for transferring weight from the towed vehicle or implement to the tractor to increase adhesion of the tractor wheels and hence to obtain increased draw-bar pull under adverse conditions of terrain.

In practice the percentage of the weight on the front axle of the trailer which can be transferred to the tractor is limited by the necessity for maintaining some degree of steering control in the trailer against lateral forces. For example, if with weight transfer in operation the tractor-trailer combination is making a gentle turn on an unmade track sloping away to the outside of the turn, or if the combination is subjected to intermittent misalignment in plan owing to the tractor and trailer wheels falling into opposing ruts, the trailer will tend to tilt and may overturn due to the weight transfer forces. With increasing weight transfer the resistance of the front wheels of the trailer to lateral movement decreases and misalignment increases.

According to the invention, in a tractor-trailer combination incorporating means for transferring weight from the towed vehicle or implement to the tractor means are provided for controlling the steering movements of the front axle of the trailer in accordance with the weight transferred. When no weight is transferred the steering is substantially free, and as the percentage of weight transferred increases a progressively increasing resistance is offered to steering movements in either direction until with full weight transfer the steering is substantially locked. Steering articulation is then at the towing pin on the tractor and the combination behaves in the same way as an articulated vehicle, and reversing is also facilitated.

Control of the steering movements of the trailer axle is conveniently effected by means of a fluid pressure ram acting on a cam of appropriate outline mounted on the steering head, and if the weight transference is effected by a hydraulic ram the ram which stabilizes the steering may be subjected to the same fluid pressure as the weight transferring ram or to a pressure directly proportional thereto so that the force acting on the cam on the steering head is proportional to the weight transference.

In a tractor-trailer combination in which the front axle of the towed vehicle or implement is mounted at or about the middle of its length for pivotal or rocking movement about a horizontal fore-and-aft axis the weight transfer is conveniently effected by a fluid pressure ram mounted on the draw-bar and actuating a bell-crank lever or equivalent member pivoted on a transverse axis on the trailer and having a forked or bifurcated arm adapted to engage and bear downwardly on the trailer axle at spaced points on opposite sides of its pivotal axis so that when weight is transferred resistance is offered to rocking movement of the trailer axle and this resistance is increased in proportion to the weight transference.

With the normal earth-moving trailer vehicle in which the front axle is pivoted about a horizontal axis the stability geometry is no better than that of a three-wheeled vehicle with a single front wheel, but by providing resistance to rocking movement of the axle increasing progressively with weight transference the effective base is broadened to that of a four-wheeler with a fixed axle. The resistance offered to rocking movement of the axle is arranged to be directly proportional to the weight transferred at any given moment, and the mechanism is so arranged that whatever the percentage resistance offered to rocking movement of the axle the effect of an undulation in the ground on either front wheel of the trailer cannot impose a greater load than the wheel would have to bear under normal rocking axle conditions. This is due to the fact that the total weight transferred from the trailer is always greater than the resistance it can impose on an individual wheel through the mechanism.

The increased stability provided by control of the rocking movement of the trailer axle is of particular advantage when weight is being transferred with the tow-bar at an angle to the trailer.

Some practical embodiments of the invention are illustrated by way of example in the accompanying drawings, in which:

Figure 1 is a diagrammatic side elevation of a tractor and a scraper coupled by a weight transferring hitch and incorporating means for stabilizing the steering movements of the front axle of the scraper, the scraper being shown in its normal position with no weight transferred.

Figure 2 is a similar view showing the scraper with its front wheels raised off the ground by the application of full weight transference.

Figure 3 is a vertical longitudinal section of the front end and steering head of a scraper and a hitch incorporating means for stabilizing both steering movements and rocking movements of the front axle of the scraper in proportion to weight transference.

Figure 4 is a plan of the steering stabilizer with the cover removed, taken on line 4—4 of Figure 3.

Figure 5 is a sectional plan on the line 5—5 of Figure 3 of the hitch and the means for controlling rocking movements of the scraper axle.

Figure 6:
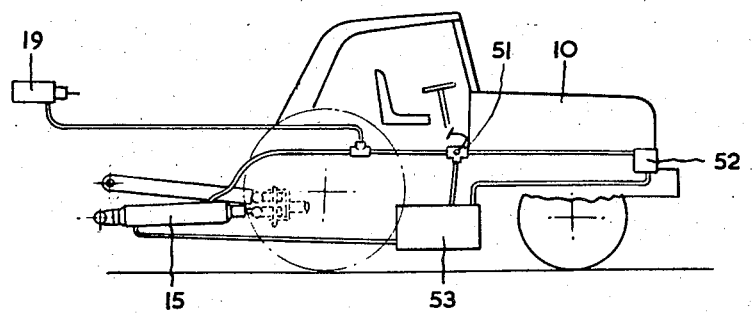
Figure 6 is a diagrammatical illustration of a hydraulic circuit for operating the rams.

In Figures 1 and 2, 10 is a tractor coupled to a trailer 11 which in this case is an earth moving scraper. The coupling or hitch comprises a rigid tow-bar 12 pivotally connected at its front end to a fitting 13 on the tractor and at its rear end to a sub-assembly 14 on the front end of the trailer, and a hydraulic ram 15 which is pivotally connected at its front end to the fitting 13 below the tow-bar connection and at its rear end to the sub-assembly 14 at a point adjacent to the lower end thereof.

The sub-assembly 14 is mounted at its lower end in a fitting which carries the front axle of the trailer and is secured to the lower end of a substantially vertical king-pin 16 mounted in the swan-neck or king-post 17 of the trailer. The upper end of the sub-assembly 14 is mounted on the upper end of the king-pin.

This coupling or hitch forms part of the subject-matter of my co-pending patent application, Ser. No. 524,695, filed July 27, 1955.

The upper end of the sub-assembly 14 carries a cam 18 which is acted on by a hydraulic ram 19 to which liquid under pressure is supplied from the same source as the weight-transferring ram 15. This source as shown in Figure 6, may conveniently be a pump 52 driven by the engine of the tractor and supplying liquid from a reservoir 53 to the rams 15 and 19 through a valve 51 under the control of the driver. As the weight transferred is dependent on the pressure in the ram 15, and there is the same pressure developed in the ram 19, the degree of opposition to steering caused by the ram 19 will be dependent on the degree of weight transfer.

When pressure fluid is admitted to the forward end of the ram 15 to contract the ram a force is applied to the sub-assembly 14 tending to lift the front end of the trailer and transfer weight from the trailer to the tractor until, if the pressure applied is sufficient, the front wheels of the trailer are lifted clear of the ground as shown in Figure 2 and the whole of the load normally carried by the front wheels of the trailer is transferred to the tractor.

At the same time the stabilizing ram 19 is energized to provide a resistance to steering movements of the trailer axle which increases progressively with the weight transference until when there is no weight on the front axle of the trailer the steering is substantially locked.

The construction and operation of the stabilizing mechanism will now be described more fully with reference to Figures 3, 4 and 5 of the accompanying drawings.

In these figures, 17 is the boom or king-post of the trailer which in the case of a scraper is usually of swanneck outline. The king-pin 16 about which the front axle of the trailer moves angularly for steering is pivotally mounted at its lower end in the lower end of the king-post and at its upper end in a built-up structure 22 welded to the king-post. In the form illustrated the king-pin is substantially vertical but in some scrapers it is rearwardly inclined, and instead of being a single continuous member it may comprise two separate axially aligned members.

A fork end 23 is mounted on the lower end of the king-pin and the front axle 24 is pivotally mounted therein for rocking movement about a longitudinal horizontal pin 25. The fork-end also carries the lower end of a built-up sub-assembly 14 of which the upper end is secured to a forward extension 27 of the steering head parts moveable about the axis a—a of the king-pin 16 at the upper end thereof and in general denoted by 30.

A cam 18 of the form shown in Figure 4 is keyed or otherwise secured on the upper end of the king-pin 16, the cam lying in a plane at right angles to the axis of the king-pin and having two oppositely extending lobes of similar outline. The cam is located at the forward end of a longitudinal housing 29 of rectangular cross-section forming the upper part of the structure 22.

The cylinder 19 of a hydraulic ram located in the housing is mounted at its rear end on a vertical pin 31. The piston-rod 32 of the ram extends forwardly and carries a forked end 33 in which is a vertical pin 34. Guide rollers 35 are mounted on the pin above and below the fork-end and roll between the rigid parallel side walls of the housing to support the fork-end against lateral thrust. A further roller 36 is mounted on the pin 31 within the fork-end and engages the cam 18.

In the normal straight ahead position of the steering the roller 36 engages the central portion of the cam between the lobes as shown in Figure 4. Any angular movement of the king-pin to either side of the central position causes one lobe or other of the cam to engage the roller 36 and urge the piston-rod 32 rearwardly against the resistance offered by any hydraulic pressure in the ram cylinder 30. At low weight transference when there is little or no pressure in the ram cylinder the effect of the ram is insufficient to affect the steering of the trailer, but as the weight transference increases with a corresponding rise in the hydraulic pressure in the ram cylinder the resistance offered to angular movement of the steering head increases until at maximum weight transference the steering head is substantially locked, and as there is then no weight on the front wheels of the trailer the tractor-trailer combination functions for steering like an articulated vehicle.

Figure 7:
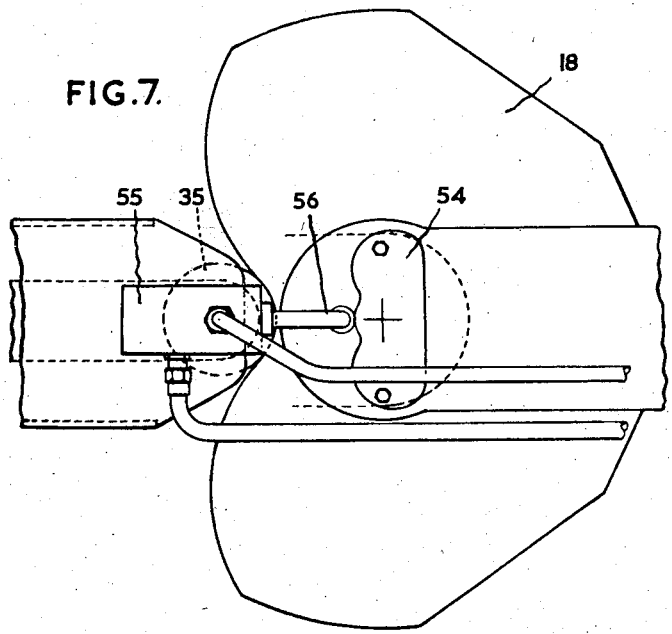
Figure 7 is a diagrammatical top view of a cam actuated relief valve for rerducing weight transference when the front axle of the trailer turns beyond a predetermined amount.

The cam 18 or a separate cam associated with the steering head may be arranged to control a relief valve in the hydraulic circuit of the ram which effects weight transference whereby the amount of weight transference possible is automatically reduced with steering movement and no weight can be transferred when the vehicles are making a 90° turn irrespective of the position of the driver's control. Figure 7 shows how this may be achieved by the separate cam 54 mounted above the cam 18 and acting through the medium of a cam follower 56 on the relief valve 55 which can be connected in the pressure circuit from the pump 52 shown in Figure 6, to by-pass fluid back to the reservoir 53 and lower the pressure in the circuit to the rams on large steering movements.

Weight transference is unnecessary in a 90° turn as the towed load is automatically reduced and if the weight transferring means is used wrongly by an unskilled driver there is a risk of overturning under certain conditions.

A preferred form of weight transferring mechanism providing for stabilizing of the rocking movement of the front axle of the trailer with weight transference is shown in Figures 3 and 5. The coupling or hitch between the tractor and the trailer comprises a rigid tow-bar 12 which is coupled at its forward end to the tractor by means 13 permitting angular movement about a vertical axis and about horizontal transverse and longitudinal axes. The side flanges of the tow-bar at the rear end are splayed outwardly and are secured to transversely spaced plates 42 which are pivotally mounted on transversely aligned bushes 43 welded into the side walls of the subassembly 14 with their axis substantially in the same horizontal plane as the front axle of the trailer. A transverse shaft 44 is rotatably mounted in the bushes 43 and a downwardly extending lever arm 45 is mounted on and keyed to the shaft between the bushes.

The rear end of an hydraulic ram 15 is pivotally connected to the free end of the lever arm by a pin 47 and the forward end of the ram is pivotally connected to the tow-bar by a pin 48. Spaced parallel lever arms 49 are keyed on the ends of the shaft 44 outside the bushings 43 and extend rearwardly from the shaft. The free ends of these lever arms are adapted to bear downwardly on wearing plates or pads 50 mounted on the upper surface of the trailer axle 24 on opposite sides of and at equal distances from the pin 25 about which the axle rocks.

When the ram 15 is energized to contract it in length the transverse shaft 44 is moved angularly in an anti-clockwise direction so that the lever arms 49 exert a downward pressure on the trailer axle whereby weight is transferred from the trailer to the tractor and at the same time resistance is offered to rocking movement of the axle. That resistance increases progressively with and in proportion to the weight transference.

Liquid under pressure is conveniently supplied to the weight transferring ram 15 and to the stablizing ram 30 for the steering from an hydraulic pump driven by the engine of the tractor, the pressure of the liquid being controlled by the driver according to conditions of working through a control valve.

In the embodiment illustrated the front axle of the trailer is substantially in vertical alignment with the steering axis or king-pin. The axle may however be located behind the steering axis, that is, it may be made to trail with respect to the king-pin. The advantage of that arrangement is that the centre of gravity of the trailer has a greater moment in opposition to the weight transferring force than with the normal arrangement, and the effect of providing resistance to rocking movement of the front axle in broadening the effective base of the front end of the trailer is maintained over a substantially greater steering lock.

The term "trailer" used herein is intended to cover any towed vehicle or implement having a front axle which

I claim:

1. A tractor-trailer combination comprising a tractor, a trailer having a front axle angularly movable about a substantially vertical axis for steering, first means for transferring weight from said front axle of the trailer to the tractor, second means for offering a resistance to steering movements of the front axle to either side of the normal straight-ahead position, and third means interconnecting said first and second means to increase said resistance progressively with increase of weight transferred.

2. A tractor-trailer combination comprising a tractor, a trailer having a front axle angularly movable about a substantially vertical axis for steering, a hitch for connecting the vehicles, a first fluid pressure means for transferring weight from the said front axle of the trailer to the tractor, and a second fluid pressure means applying resistance to steering movements of the said front axle to either side of the normal straight-ahead position, and a connection between said first and second means to provide said second means with fluid at a pressure related directly to the pressure in the first fluid pressure means whereby the resistance to steering movements is proportional to the weight transferred.

3. A tractor-trailer combination as in claim 2 wherein said means for applying resistance to steering movements of the front axle of the trailer comprises a king-pin about the axis of which the axle moves angularly for steering, a cam having two oppositely extending lobes of similar outline mounted on said king-pin, an hydraulic ram forming said second fluid pressure means and mounted on the trailer with its axis extending longitudinally, a roller actuated by said ram and adapted to bear on said cam, and guiding means for locating said roller against lateral movement.

4. A tractor-trailer combination comprising a tractor, a trailer having a front axle assembly which moves angularly for steering, a hitch connecting said tractor to said front axle assembly, hydraulic means associated with the hitch for transferring weight from the front axle of the trailer to the tractor, means for applying resistance to steering movements to either side of the normal straight-ahead position, and means associated with the front axle assembly for reducing the amount of possible weight transfer in accordance with the degree of angular movement of said assembly about said axis and for preventing any weight transfer when the vehicles are making a 90° turn.

5. A tractor-trailer combination comprising a tractor, a trailer having a front axle mounted for rocking movement about a horizontal longitudinal axis with respect to said trailer, means for transferring weight from the front axle of the trailer to the tractor, means for controlling steering movements of the said axle in accordance with the weight transferred, and means for resisting rocking movements of the axle about its axis with a force proportional to the weight transference.

6. A tractor-trailer combination comprising a tractor, a trailer having a front axle mounted for rocking movement about a longitudinal horizontal axis with respect to said trailer, a hitch connecting the vehicles, means for transferring weight from the front axle of the trailer to the tractor, and means for controlling steering movements of the said axle in accordance with the weight transferred, said weight transferring means comprising a transverse horizontal shaft on the trailer in front of the axle, an arm mounted on said shaft, an hydraulic ram connected between the free end of the said arm and an anchorage on the hitch, and spaced parallel rearwardly extending lever arms mounted on said shaft and bearing at their free ends on the said trailer front axle at points on opposite sides of and at equal distances from the horizontal axis about which the axle rocks.

7. A tractor-trailer combination comprising a tractor rear axle, a trailer front axle, a tow bar connecting between said tractor and trailer, means associated with said tow bar connection and capable of controllably transferring a proportion of the weight of said trailer front axle to said tractor rear axle, said trailer front axis being steerable about a vertical axis, and controllable cam and roller means acting between said trailer and its front axle whereby to oppose relative movement of said front axle about said vertical axis, and a common control for said controllable weight-transferring means and said controllable cam and roller means whereby the degree to opposition to steering movement is automatically and progressively controlled in step with the degree of weight transfer.

8. A tractor-trailer combination comprising a tractor rear axle and a trailer front axle, a tow bar connection between said tractor and said front axle of the trailer, a first pressure fluid-operated ram associated with said tow bar, which on energization transfers weight from said front axle of the trailer to said rear axle of the tractor, said front axle being steerable about a vertical axis with respect to said trailer, cam and roller means acting between said front axle and trailer and serving to oppose steering movements away from the straight-ahead position, a second pressure fluid-operated ram, said second ram on energization causing a reaction between said cam and roller, a source of fluid pressure, a control valve, a fluid connection between said source and said control valve, and fluid connections between said control valve and said first and second rams.

9. A tractor-trailer combination comprising a tractor, a trailer having a front axle angularly movable about a substantially vertical axis for steering, a hitch for connecting the vehicles, a first fluid pressure means for transferring weight from the said front axle of the trailer to the tractor, and a second fluid pressure means applying resistance to steering movements of the said front axle to either side of the normal straight ahead position, a source of fluid under pressure, a controllable relief valve, a fluid connection between said source and said relief valve, a fluid connection between said relief valve and said first fluid pressure means and a fluid connection between said relief valve and said second fluid pressure means.

10. A tractor-trailer combination as in claim 9, wherein said means for applying resistance to steering movements of the front axle of the trailer comprises a cam associated with said front axle and a roller actuated by said second fluid pressure means, said second fluid pressure means being mounted on said trailer.

11. A tractor-trailer combination comprising a tractor, a trailer having a front axle steerable with respect to said trailer about a vertical axis, a hitch between said tractor and said front axle, adjustable means for transferring weight from said front axle of the trailer to said tractor, adjustable means associated with said front axle and trailer and opposing steering movements of said front axle away from the straight-ahead position, and means for controlling simultaneously said weight transferring means and said steering-opposing means, whereby the degree of weight transfer and the degree of opposition to steering change progressively in step with one another.

12. A tractor-trailer combination as claimed in claim 11, wherein said front axle can also rock about a longitudinal horizontal axis, and including means associated with said weight-transferring means for acting on said axle to oppose rocking movements with a force proportional to degree of weight transfer.

References Cited in the file of this patent

UNITED STATES PATENTS

| | | |
|---|---|---|
| 2,266,913 | Simmons | Dec. 23, 1941 |
| 2,330,897 | Kirksey | Oct. 5, 1943 |
| 2,718,410 | Simmons | Sept. 20, 1955 |